United States Patent [19]

Van Dam

[11] Patent Number: 4,776,542
[45] Date of Patent: Oct. 11, 1988

[54] AIRCRAFT STALL-SPIN ENTRY DETERRENT SYSTEM

[75] Inventor: Cornelis P. Van Dam, Davis, Calif.

[73] Assignee: Vigyan Research Associates, Inc., Hampton, Va.

[21] Appl. No.: 54,839

[22] Filed: May 27, 1987

[51] Int. Cl.[4] .................. B64C 3/00; B64C 5/00
[52] U.S. Cl. .................. 244/198; 244/199; 244/45 R
[58] Field of Search .............. 244/198, 199, 35 R, 244/34 R, 45 R, 46 R, 207

[56] References Cited

U.S. PATENT DOCUMENTS

| | | |
|---|---|---|
| D. 205,169 | 6/1966 | Petry . |
| 1,841,921 | 1/1932 | Spiegel . |
| 2,020,616 | 11/1935 | Molici . |
| 2,537,369 | 1/1951 | Ostroff . |
| 2,743,888 | 5/1956 | Lippisch ............... 244/199 |
| 2,747,816 | 5/1956 | Howard . |
| 2,925,233 | 2/1960 | Dunn et al. . |
| 3,392,936 | 7/1968 | Wornom . |
| 3,411,738 | 11/1969 | Sargent ............... 244/199 |
| 3,712,564 | 1/1973 | Rethorst . |
| 3,883,094 | 5/1975 | Mederer . |
| 4,108,403 | 8/1978 | Finch ............... 244/199 |
| 4,240,597 | 12/1980 | Ellis et al. . |
| 4,477,042 | 10/1984 | Griswold, II . |
| 4,598,885 | 7/1986 | Waitzman ............... 244/45 R |
| 4,671,473 | 6/1987 | Goodson ............... 244/199 |
| 4,700,911 | 10/1987 | Zimmer ............... 244/45 R |
| 4,705,240 | 11/1987 | Dixon ............... 244/207 |

FOREIGN PATENT DOCUMENTS 509764  10/1930  Fed. Rep. of Germany ...... 244/199

OTHER PUBLICATIONS

*Gulfstreamer*, vol. 5, No. 6, Winter 1976.

*Primary Examiner*—Galen Barefoot
*Assistant Examiner*—Lynn M. Fiorito
*Attorney, Agent, or Firm*—Wallace J. Nelson

[57] ABSTRACT

A system for deterring subsonic airplane stall-spin entry wherein a highly swept wing tip mounted lifting surface panel 18 (FIGS. 1-3) is attached to the tip of a main wing panel 14 and provides a stabilizing vortex lift to the aircraft at an angle of attack slightly greater than the normal angle of attack used in climbing flight. This vortex lift enhances roll damping at high angles of attack and serves to prevent airplane stall-spin entry. FIG. 4 shows an alternate form of the invention wherein the wing tip mounted lifting surface panel 48 is provided with a forward highly swept leading edge. For sharp leading edges a leading edge sweep for the wing tip mounted lifting surfaces is approximately forty-five degrees while, for blunt leading edge surfaces, a greater degree of sweep is employed to generate the vortex lift.

8 Claims, 2 Drawing Sheets

AIRCRAFT STALL-SPIN ENTRY DETERRENT SYSTEM

ORIGIN OF THE INVENTION

This invention was made with U.S. Government support under Contract NAS1-17797 awarded by the National Aeronautics and Space Administration. Accordingly, the U.S. Government has certain rights in this invention.

BACKGROUND OF THE INVENTION

This invention relates generally to subsonic aircraft and relates in particularly to highly swept wing-tip mounted lifting surfaces to deter aircraft stall-spin entry.

Numerous solutions have been proposed by industry and government researchers over the years to eliminate or minimize aircraft stall and spin. It has been determined that stall-spin entry can be prevented by means of an active system or a passive system. An active system is intended to eliminate airplane stall and therefore airplane spin. Of the two types of active systems now employed, one is the active stall warning system which functions to warn the pilot of an impending stall and consequently permit him to take measures to prevent the airplane stall. This type of system includes stall horns, control-stick shakers, control-stick pushers and other warning devices. The other type of active system employed is the active stall deterrent system which automatically limits airplane angle of attack to one or two degrees less than the stall angle of attack to thereby prevent airplane stall and subsequent spin.

A large number of passive systems are available to prevent airplane stall-spin entry. Research at NASA Langley Research Center has determined that two passive systems are most successful in providing stall-spin protection for subsonic airplanes. The first system is the wing leading-edge droop modification. This modification has been developed for subsonic airplanes with no or modest degrees of wing sweep. Generally, when the leading-edge droop is added to the outboard portion of the wing, good airplane stall characteristics and spin resistance are obtained. The leading-edge droop modification consists of a glove over the forward part of the airfoil which provides a chord extension of approximately three percent and a droop which increases the leading-edge camber. The addition of a leading edge droop on the outboard portion of the wing delays stall of the outboard-wing portion to very high angles of attack and therefore deters airplane spin. The effectiveness of the wing leading-edge droop modification in delaying outboard-wing stall to high angles of attack is caused by vortex flow at the inboard end of the droop, which prevents separated flow from progressing outboard on the wing. The core of this vortex follows the direction of the freestream airflow.

The second passive system is the canard-configuration concept. A canard-airplane configuratin has a forward-mounted horizontal tail surface or canard surface and an aft-mounted wing. The canard surface is designed to have a lower stall angle of attack as compared to the wing stall angle of attack. Therefore, at high angles of attack the canard surface will stall prior to the wing. The lift contribution of the installed wing then dominates and produces a stabilizing nose-down pitching moment. As a result of this stabilizing pitching moment, the maximum angle of attack is limited to an angle well below the value required for wing stall. Thus, airplane stall and consequently, airplane spin are prevented.

Although each of the discussed prior art systems have their advantages they also have disadvantages. For example, although active stall warning systems warn the pilot of an approaching stall, they do not automatically prevent airplane stall and subsequent spin. Active stall warning systems also are more complicated than passive systems, and the potential failure modes of active systems are greater than passive systems. Further, as a result of the complexity and potential failure modes of active systems, more maintenance is required and active systems have generally higher weight than passive systems. The main disadvantage of the wing leading edge droop modification, a passive system, is that it tends to be ineffective when added to a wing having relatively blunt leading edge airfoil sections. Another disadvantage is the increase in cruise drag resulting from the increase in leading edge camber.

Although the canard configuration passive system effectively prevents airplane stall-spin entry, the required changes in airplane system layout and airplane aerodynamic design restrict the use thereof. It is not feasible to modify an airplane, from a conventional forward mounted wing configuration into a canard aft mounted wing configuratin, except in the very early stages of the airplane design. Also, the effectiveness of the stall resistance characteristics provided by the canard configuration concept can be influenced by many design variables, including relative geometry of the canard and wing, canard and wing airfoil sections, engine-propeller slipstream effects and center-of-gravity location. These variables can seriously affect the stall angle of attack of both canard and wing, and thereby negatively influence the stall resistance characteristics of the canard configuration.

BRIEF DESCRIPTION OF THE INVENTION

It is therefore an object of the present invention to provide an improved passive stall-spin entry deterrent system that utilizes the advantageous features of previous systems while minimizing the disadvantages thereof.

It is a further object of the present invention to provide a passive spin-stall entry deterrent system that is independent of the main wing airfoil sections.

It is a further object of the present invention to provide an improved passive spin-stall entry deterrent system that may be retro-fitted onto existing subsonic aircraft or formed as an integral portion of an aircraft wing during manufacture thereof.

It is a further object of the present invention to provide a passive spin-stall entry deterrent system that produces a minimum increase in wing profile drag at cruise angles of attack.

It is another object of the present invention to provide a passive stall-spin entry deterrent system that reduces wing lift-induced drag by improving span-load distribution to near theoretical optimum at cruise and climb angles of attack.

Another object of the present invention is to provide a novel passive stall-spin entry deterrent system that is simple in design, has minimum design variables, minimum maintenance requirements, and is less expensive than previous systems.

Another object of the present invention is to provide a novel passive system that deters subsonic aircraft stall-spin entry by utilizing vortex lift on the outboard tip portion of the wing.

A further object of the present invention is a system that combines the capabilities of airplane stall-spin prevention and cruise-drag and climb-drag reduction.

According to the present invention the foregoing and additional objects are attained by providing a highly swept wing-tip mounted lifting surface to the wing of a subsonic airplane, having no or modest amount of wing sweep, and serving to deter airplane stall-spin entry. This stall-spin entry protection device is a passive system and is based on its aerodynamic design. The wing-tip mounted surface of the present invention is provided with a leading-edge sweep angle of forty-five degrees or more in order to generate vortex lift at angles of attack greater than the angle of attack in climbing flight. Additionally, the highly swept wing-tip mounted lifting surface is situated in the wing plane and reduces airplane lift-induced drag in cruising and climbing flight.

BRIEF DESCRIPTION OF THE DRAWINGS

A more complete appreciation of the invention and many of the attendant advantages thereof will be readily apparent as the same becomes better understood with reference to the following detailed description when considered in connection with the accompanying drawings wherein.

DETAILED DESCRIPTION OF THE INVENTION

Figure 1:
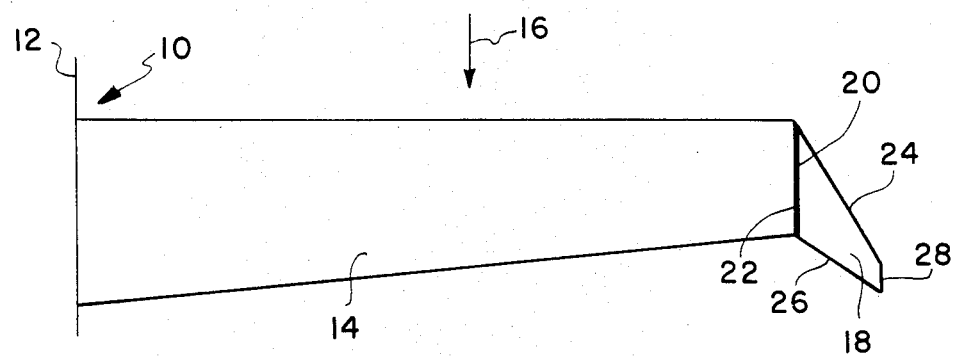
FIG. 1 is a top plan view of a typical subsonic airplane wing having attached thereto the highly swept, wing-tip mounted, stall-spin entry deterrent system of the present invention.
Figure 1A:
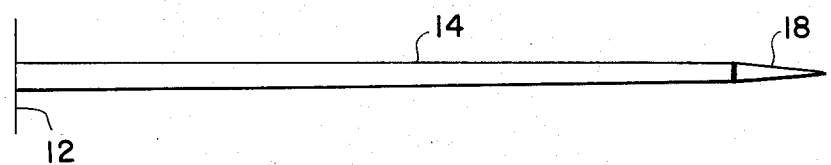
FIG. 1a is a front view of the airplane wing and wing-tip mounted stall-spin entry deterrent system shown in FIG. 1.
Figure 1B:
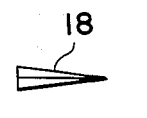
FIG. 1b is a front view of the airplane wing-tip having a sharp leading edge.

Referring now to the drawings, and more particularly to FIGS. 1 and 1a, there is shown a portion of a subsonic airplane generally designated by reference numeral 10, and including a fuselage 12, and a main wing panel 14. The direction of wind flow over wing panel 14 during flight of airplane 10 is indicated by arrow 16. A highly swept, wing tip mounted, lifting surface panel 18 is disposed in the same wing plane as main wing panel 14. Wing tip panel 18 is provided with a root chord 20 of substantially the same length as, and is rigidly attached to, the outboard tip chord 22 of wing panel 14. The juncture between the main wing panel tip chord 22 and the root chord 20 of the wing tip panel 18 is sealed to preclude any airflow leakage from the lower surface of the wing to the upper surface. Normally, the leading edge 24 of wing tip 18 is provided with a rearward sweep angle greater than approximately forty-five degrees in order to obtain separation-induced leading edge vortex flow at high angles of attack. The minimum required sweep angle for leading edge 24 is a function of the sharpness or thinness of the leading edge. In the case of a very sharp leading edge, the minimum sweep angle required will be approximately forty-five degrees, while a relatively blunt leading edge requires a leading-edge sweep angle of more than forty-five degrees.

The trailing edge 26 of wing-tip panel 18 is provided with a sweep angle smaller than the leading edge 24 sweep angle. As a result, the tip-chord length of the highly swept wing tip mounted panel lifting surface 18 is smaller or shorter than the root-chord length 20 thereof. As shown more clearly in FIG. 1a, wing tip mounted lifting surface panel 18 is disposed in the same plane as main wing panel 14.

Figure 2:
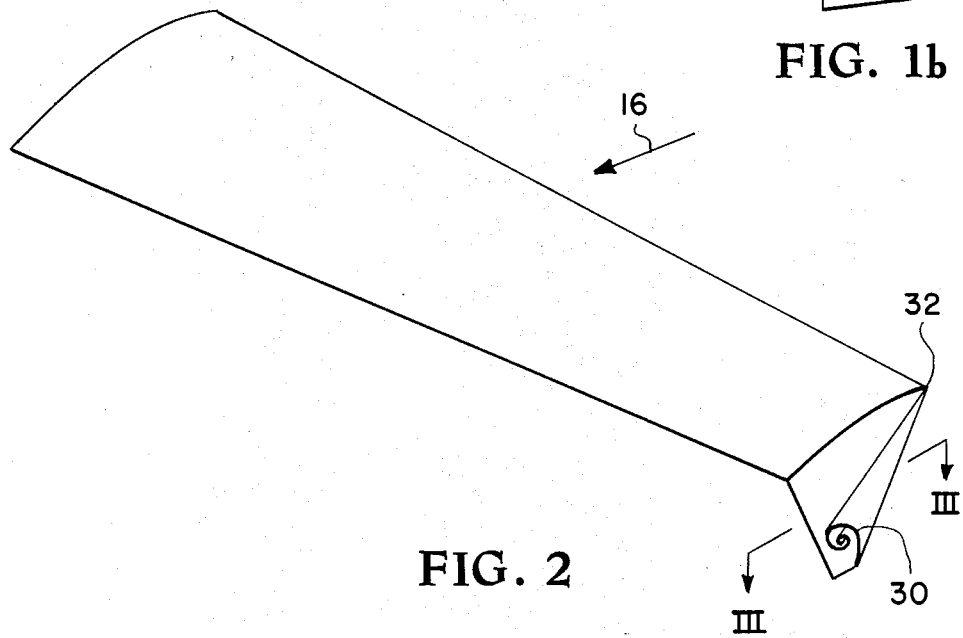
FIG. 2 is a view of the system shown in FIG. 1 with a schematic illustration of the attached leading-edge vortex formed with the leading edge of the highly swept wing-tip panel.
Figure 3:
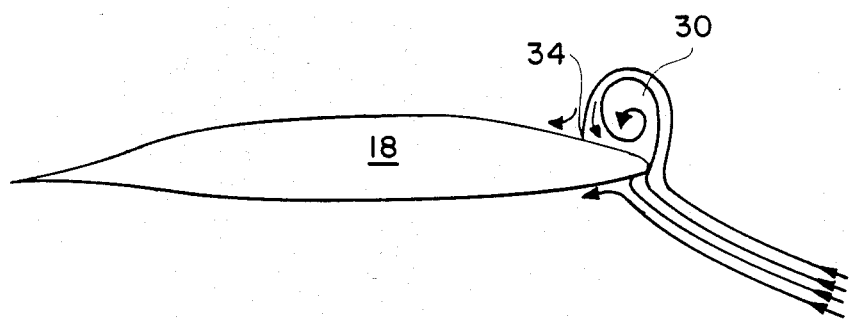
FIG. 3 is part schematic view of the present invention taken along line III—III of FIG. 2.

At low angles of attack, the airflow around the main wing panel 14 and the highly swept wing tip 18 is attached. The highly swept wing tip panel 18 produces a significant thrust force in the direction of airplane flight. Because of that, the swept wing tip 18 reduces wing lift-induced drag at these flight conditions. At an airplane angle of attack slightly greater than the angle of attack normally used in climbing flight, the airflow around the highly-swept leading edge 24 of the wing-tip panel 18 separates from the lifting surface and rolls up in a vortex 30 (FIG. 2). Vortex 30 originates at the root apex 32 of wing tip panel 18 and the vortex core runs roughly parallel to the leading edge 24 of the tip-mounted lifting surface 18. The separated flow reattaches to the panel surface a short distance downstream of the leading edge 24 as designated by reference numeral 34 (FIG. 3). The resulting increment in lift at a given angle of attack is referred to as vortex lift.

With increasing angle of attack the flow around the remaining part of wing 14 will also separate from the upper surface thereof. Since wing panel 14 has no or only a modest leading edge rearward sweep angle, no vortex lift is generated on this surface.

The attached flow over the wing-tip mounted lifting surface 18 results in enhanced airplane roll damping at high angles of attack as compared to the same wing without a highly-swept tip. Reduced or negative airplane roll damping and yaw damping at or near airplane stall angle of attack is recognized as a major cause of airplane stall-spin entry. The enhanced roll and yaw damping as a result of vortex lift generated by the present invention prevents airplane stall-spin entry and is a valid improvement over the prior art.

Figure 4:
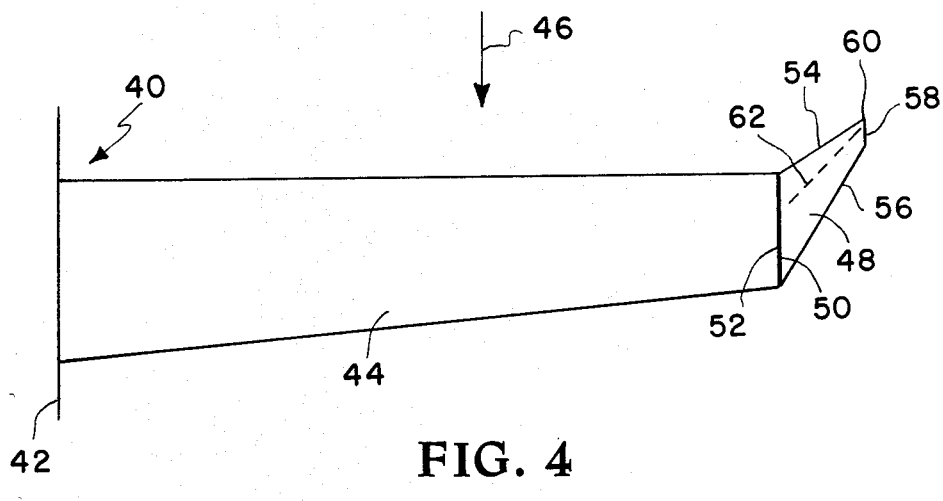
FIG. 4 is a view similar to FIG. 1 illustrating a modified form of the invention.

Referring now more particularly to FIG. 4 an alternate embodiment of the present invention is shown employing a variation of the geometry of the wing tip panel portion. In this embodiment a portion of an airplane, generally designated by reference numeral 40 is shown, and includes a fuselage 42 and a main wing panel 44 having no or only a modest degree of sweep. The direction of air flow over wing panel 44 is indicated by arrow 46. A wing-tip lifting surface panel 48 is secured at the root chord 50 thereof to the tip chord 52 of main wing panel 44. The attachment surfaces are sealed at the juncture thereof to prevent any air leakage from the lower surface of the panels to the upper surfaces thereof, as in the previously described embodiment. The leading edge 54 of wing-tip lifting surface panel 48 can have a large negative sweep angle in order to obtain separation induced leading edge vortex flow at high angles of attack. In this case, the trailing edge 56 of the tip panel 48 is provided with a negative sweep angle larger than the leading edge 54 sweep angle. As a result, the tip-chord 58 length of the forward swept wing tip lifting surface panel 48 is smaller than the root chord length 50 of the panel. At low angles of attack, the flow around the inboard main wing panel 44 and the highly swept outboard wing tip lifting surface panel 48 is attached. However, the thrust force in the direction of flight produced by the forward swept tip panel 48 is smaller as compared to the rearward swept wing tip panel 18 described hereinbefore. Consequently, the lift induced drag reduction due to sweeping forward the outboard portion of the wing is insignificant. At high angles of attack, the separation induced leading edge vortex originates at the tip apex 60 of the forward swept wing tip mounted lifting surface 48. The vortex core runs roughly parallel to the leading edge of the wing tip panel 48 and the separated flow reattaches to the wing tip lifting surface 48 along the dotted line designated by reference numeral 62 a short distance downstream of the forward swept leading edge 54.

The operation of the invention is believed apparent from the above description. At low angles of attack, the airflow around the main wing panel (11, FIGS. 1-3) is attached. The highly swept wing tip panel produces a significant thrust force in the direction of flight. Because of that, the swept tip reduces wing lift-induced drag at these flight conditions. At an airplane angle of attack slightly greater than the angle of attack in climbing flight, the airflow around the highly swept leading edge of the wing tip mounted lifting surface separates from the surface and rolls up in a vortex. This vortex originates at the root apex of the tip panel and its core runs roughly parallel to the leading edge of the tip mounted lifting surface. The flow reattaches to the surface a short distance downstream of the leading edge of the wing tip panel. The resulting increment in lift at a given angle of attack is referred to as vortex lift. Because of the absence of or the presence of a very low leading edge sweep angle on the main wing panel, no vortex lift is generated on this surface. The vortex on the tip device, however, is very stable and it will exist and produce lift for angles of attack beyond stall angle of attack for the main wing panel. The attached flow over the wing tip lifting surface results in enhanced airplane roll damping at high angles of attack for the main wing panel. The wing without a highly swept tip. Reduced or negative airplane roll damping and yaw damping at or near airplane stall angle of attack is a major cause of airplane stall-spin entry. Enhanced roll and yaw damping as a result of vortex lift prevents airplane stall-spin entry.

Although the invention has been described relative to specific embodiments thereof it is not so limited and numerous variations and modifications of these specific embodiments will be readily apparent to those skilled in the art in the light of the above teachings. For example, the preferred embodiments show an aircraft having wing portions extending from the approximate midline of the aircraft fuselage but the invention is equally applicable to wing structures that extend above or below the aircraft fuselage. Also, although only one side of an aircraft fuselage is shown in the preferred embodiments, it is to be understood that the opposite side and wing segment not shown is a mirror image of the side that is shown and has been omitted only in the interest of clarity.

It is therefore to be understood that, within the scope of the appended claims, the invention may be practiced otherwise than as specifically described herein.

What is claimed as new and desired to be secured by Letters Patent of the U.S. is:

1. A passive system for deterring stall-spin entry of a subsonic aircraft comprising, in combination:
    an aircraft wing having
    (1) a main inboard wing panel extending from an aircraft fuselage and provided with a root chord attached to the aircraft fuselage and a tip chord having a reduced length relative to said root chord, and
    (2) A wing tip lifting surface panel having a root chord rigidly attached to the tip chord of said main inboard wing panel and in the same wing plane as said main wing panel, said wing tip lifting surface panel having a leading edge sweep and a trailing edge sweep and terminating in a tip chord length a fraction of the root chord length thereof.

2. The passive system for deterring stall-spin entry of a subsonic aircraft as in claim 1 wherein said wing tip lifting surface panel has a sharp leading edge and a leading edge rearward sweep of at least forty-five degrees.

3. The passive system for deterring stall-spin entry of a subsonic aircraft as in claim 2 wherein said wing tip lifting surface panel also has a trailing edge rearward sweep and wherein the leading edge rearward sweep exceeds that of the trailing edge rearward sweep.

4. The passive system for deterring stall-spin entry of a subsonic aircraft as in claim 1 wherein said wing tip lifting surface panel has a sharp leading edge and a forward leading edge sweep of approximately forty-five degrees.

5. The passive system for deterring stall-spin entry of a subsonic aircraft as in claim 1 wherein said wing tip lifting surface panel has a blunt leading edge and a leading edge rearward sweep exceeding forty-five degrees.

6. The passive system for deterring stall-spin entry of a subsonic aircraft as in claim 1 wherein said wing tip lifting surface panel has a blunt leading edge and a leading edge forward sweep exceeding forty-five degrees.

7. A method of deterring stall-spin entry of a subsonic aircraft having a main wing panel extending substantially perpendicular from the aircraft fuselage and terminating in a tip chord length less than the root chord thereof including the steps of:
    providing a lifting surface wing tip panel on the same plane with, and integrally attached to, the tip chord length of the main wing panel,
    trimming the wing tip panel to provide a highly swept leading edge rearward sweep and a rearward trailing edge sweep such that the leading edge rearward sweep is approximately forty-five degrees and exceeds the angular rearward trailing edge sweep,
    providing the lifting surface wing tip panel with a terminal chord length wherein the wing tip panel root chord length exceeds the length of the terminal tip chord,
    whereby, at low angle of attack, the airflow around the main wing panel is attached and the highly swept wing tip lifting surface panel produces a thrust force in the direction of flight and, at an airplane angle of attack slightly greater than the normal angle of attack used in climbing flight, the airflow around the highly swept leading edge of the wing tip mounted lifting surface panel separates from the surface and rolls up in a vortex originating at the root apex of the wing tip mounted lifting surface with the vortex core running parallel to the leading edge of the wing tip mounted lifting surface panel and reattaching to this surface a short distance downstream of the leading edge thereof to generate a stabilizing vortex lift for angles of attack beyond stall angle of attack for the main wing panel.

8. A system for deterring aircraft stall-spin entry comprising, in combination:

a main aircraft wing panel extending from a root chord at an aircraft fuselage to a tip chord of reduced length relative to said root chord, said main aircraft wing having no or only modest wing sweep, a wing tip mounted lifting surface panel having a root chord of substantially the same length as and integrally attached to the tip chord of, and disposed in the same wing plane as, said main aircraft wing, said wing tip mounted lifting surface panel having a leading edge and a trailing edge, said leading edge having a rearward sweep angle of at least forty-five degrees and said trailing edge having a rearward sweep of less than forty-five degrees, and said leading edge and said trailing edge terminating at the tip of said wing tip mounted lifting surface panel with a tip chord length less than the root chord thereof attached to said main wing panel.

* * * * *